United States Patent [19]
Baensch et al.

[11] Patent Number: 5,965,178
[45] Date of Patent: Oct. 12, 1999

[54] HYDROLYZATE SEASONING PREPARATION IN THE PRESENCE OF LACTIC ACID BACTERIA

[75] Inventors: Johannes Baensch, Le Breuil-En-Auge, France; Walter Gaier, Le Mont-Pelerin; Hazel Geok Neo Khoo, Lausanne, both of Switzerland; Howe Ling Lai; Bee Gim Lim, both of Singapore, Singapore

[73] Assignee: Nestec S.A., Vevey, Switzerland

[21] Appl. No.: 08/914,583

[22] Filed: Aug. 18, 1997

[30] Foreign Application Priority Data

Aug. 19, 1996 [EP] European Pat. Off. .............. 96202309

[51] Int. Cl.⁶ ................................ A23B 7/10; A23L 1/105
[52] U.S. Cl. .................. 426/52; 426/49; 426/46; 426/7; 426/60
[58] Field of Search .................. 426/49, 52, 46, 426/7, 60

[56] References Cited

U.S. PATENT DOCUMENTS

| | | | |
|---|---|---|---|
| 3,912,822 | 10/1975 | Yokotsuka et al. | 426/44 |
| 4,308,284 | 12/1981 | Noda et al. | 426/7 |
| 4,587,127 | 5/1986 | Akao et al. | 426/46 |
| 4,722,846 | 2/1988 | Abe et al. | 426/46 |
| 4,851,241 | 7/1989 | Tsuji et al. | 426/56 |
| 5,141,756 | 8/1992 | Bajracharya et al. | 426/46 |
| 5,523,100 | 6/1996 | Teh | 426/46 |
| 5,626,894 | 5/1997 | Bengtsson et al. | 426/62 |

FOREIGN PATENT DOCUMENTS 0829205  3/1998  European Pat. Off. .......... A23L 1/00

OTHER PUBLICATIONS

Baensch, et al., Patent Specification entitled "Seasoning Production" (dated Aug. 1996).

Database Abstract, Derwent Information Ltd., WPI Accession No. 93–33888/199343, abstract of Japanese Patent Document No. JP–A–05244897 (1993).

Database Abstract, Derwent Information, Ltd., WPI Accession No. 76–19367x/197611, abstract of Japanese Patent Document No. JP–A–61009797 (1976).

Database Abstract, Derwent Information Ltd., WPI Accession No. 93–356419/199345, abstract of Japanese Patent Document No. JP–A–05260296 (1993).

*Primary Examiner*—Chhaya D. Sayala
*Attorney, Agent, or Firm*—Vogt & O'Donnell, LLP

[57] ABSTRACT

A seasoning composition is prepared by preparing a koji and in the absence of added salt, hydrolyzing the koji in the presence of a culture of lactic acid bacteria at a temperature between 15° C. and 60° C. and at a pH of from 4.5 to 10 for a period of from 6 hours to 28 days, and the seasoning composition is obtained without preparing a moromi. Inoculation with the lactic acid bacteria culture is carried out either in the hydrolysis stage or in the koji preparation stage, and the hydrolysis may be carried out in two stages with the culture present during the first stage and so that the temperature of the first stage hydrolysis is between 20° C. and 60° C. and particularly between 25° C. and 50° C. and so that the second stage temperature is from 2° C. up to 20° C., and the second stage hydrolysis is carried out for at from 12 hours to 25 days and the first and second stage hydrolysis are carried out for a combined time of from 18 hours to 28 days.

22 Claims, No Drawings

HYDROLYZATE SEASONING PREPARATION IN THE PRESENCE OF LACTIC ACID BACTERIA

BACKGROUND OF THE INVENTION

The present invention relates to a process for the production of a seasoning, more particularly to the production of seasoning by the biological hydrolysis of protein-containing material.

Hydrolysed proteins have been known for use as seasonings in food systems for centuries in the Far East in the form of soya sauce which traditionally has been prepared by enzymatic hydrolysis requiring a long period of time, usually several months, for preparation. In producing soya sauce, plant protein-containing materials such as cooked soya beans or defatted soya flour together with carbohydrates are inoculated with Aspergilli and the solid culture is fermented for 2 days to make fermented koji during which time enzymes are produced which are able to hydrolyse protein and carbohydrates in the moromi treatment stage. The fermented koji is mixed with a solution of common salt to give moromi which is fermented for 4 to 8 months by the activity of micro-organisms such as soya lactic acid bacteria and soya yeasts from which the soya sauce is obtained by removing the solids portion from the fermented moromi.

About 100 years ago, a more rapid method of hydrolysing proteins for producing seasonings was developed using hydrochloric acid in which the time required is only a few hours. However, in recent years, the use of acid hydrolysed plant protein (HPP) in culinary applications has been under criticism due to the presence of some chloro-compounds which arise from the acid process. Therefore, attempts have been made to develop HPP replacements which can be used as body-givers in culinary applications. Soya sauce is one such suitable replacement. However, owing to the differences in the raw materials and the processing methods involved, the two products, HPP and soya sauce, have some differences in terms of chemical composition and flavour profile. Dosage of soya sauce which can be used as an HPP replacement is limited due to its "fermented" note. The different processing procedures also result in a significant variation in the degree of hydrolysis of the protein containing material to the amino acids. Soya sauce has a lower amino acid content than HPP and this leads to a significantly weaker body in soya sauce than in HPP. European Patent Application No. 93113388.8 (and see counterpart U.S. Pat. No. 5,523,100) describes a process for the production of a seasoning based on modified standard soya sauce technology in which the fermented koji is treated, before forming the moromi, by a low temperature hydrolysis whereby the resultant seasoning has a stronger body than a standard soya sauce. In this process, a fermented protein koji, prepared from a protein containing material and a carbohydrate, is treated by hydrolysing the fermented protein koji at a temperature of from 2° to 25° C. and a pH of from 4.5 to 10 for a period of from 6 hours to 28 days. In order to improve the organoleptic and colour stability of the seasoning product, salt and yeast are conveniently added to the hydrolysed fermented koji to form a moromi and the moromi is preferably fermented under aerobic or anaerobic conditions for a period of from 1 to 6 weeks, more preferably from 2 to 4 weeks.

SUMMARY OF THE INVENTION

European Patent Application Publication No. EP 0 829 205 and in its U.S. counterpart, application Ser. No. 08/921, 264, describe a process which is similar to that described in the afore-noted Application No. 93113388.8. As described in the '205 Application, yeast is incorporated during the hydrolysis of the fermented protein koji, co-hydrolysis of the fermented protein koji and yeast occurs and the subsequent moromi stage is unnecessary. This has the advantage of shortening the whole production time by at least one week. In addition, the amount of salt in the seasoning product may be varied as desired, e.g. from 0 to 100% by weight based on the weight of the fermented protein koji.

During cold hydrolysis at temperatures from 2° to 25° C., the numbers of most microorganisms are stable or reduced. When the cold hydrolysis is operated in the absence of salt, the yield of glutamic acid is maximised. While temperatures in excess of 25° C. accelerate the rate of hydrolysis, there is a risk of growth of undesirable microorganisms especially when the hydrolysis is operated in the absence of salt. We have found that inoculation with a culture of lactic acid bacteria at an inoculation density of from $10^3$ to $10^7$ colony forming units per gram (cfu/g) of fermented protein koji protects the fermented protein koji against growth of undesirable microorganisms during hydrolysis.

Accordingly, the present invention provides a process for the production of a seasoning which comprises preparing a fermented protein koji from a protein-containing material and a carbohydrate, hydrolysing the fermented protein koji at a temperature between 15° C. and 60° C. and a pH of from 4.5 to 10 for a period of from 6 hours to 28 days characterised in that inoculation with a culture of a lactic acid bacteria is carried out either in the fermented protein koji stage or in the hydrolysis stage, which provides for hydrolysis in the presence of lactic acid bacteria. Inoculation is carried out with the culture at an inoculation density of from $10^3$ to $10^7$ cfu/g material.

DETAILED DESCRIPTION OF THE INVENTION

In carrying out the present invention, non-limiting examples of lactic acid bacteria which may be used include *Lactobacillus sake* (*L. sake*), *L. crispatus*, *L. gasseri*, *L. johnsonii*, *L. reuteri*, *L. rhamnosus*, *L. curvatus*, *L. plantarum*, *L. helveticus*, *L. paracasei*, *L. fermentum*, *L. alimentarius*, *L. brevis*, *L. delbrueckii*, *L. farciminis*, *L. acidophilus* and other Lactobacillus species, *Leuconostoc mesenteroides*, *Pediococcus pentosaceus*, *Pediococcus acidilactici*, *Streptococcus thermophilus*, *Enterococcus faecalis*, *Enterococcus faecium* and *Tetragenococcus halophilus*, etc. These organisms may also be used as mixtures of different strains which may comprise different (two or more) species.

The fermented protein koji is prepared by the conventional soya sauce process which comprises, for example, inoculating a protein-containing material and a carbohydrate with a culture of *Aspergillus oryzae* and/or *Aspergillus sojae* on a culture bed to form the fermented koji. The protein-containing material is advantageously a plant protein material, for instance, soya beans, corn gluten or rice gluten but is preferably wheat gluten. The plant protein-containing material is advantageously cooked and is preferably used in solid particulate form for enabling the mould of *Aspergillus oryzae* and/or *Aspergillus sojae* to grow on the surface of the particles and eventually penetrate into the particles. The koji is conveniently fermented in the solid state. When inoculation with a culture of a lactic acid bacteria is carried out in the fermented protein koji stage, the inoculation may take place before, at the beginning, or at any time during the fermentation process.

The hydrolysis of the fermented protein koji in the presence of water may be carried out in the absence or presence of salt and advantageously with constant agitation. When salt is present, the amount may be up to 100% by weight based on the weight of the fermented protein koji. The amount of salt present may be varied, as desired, for instance, depending on the nature of the lactic acid bacteria used. For example, some lactic acid bacteria only withstand a little salt or do not withstand salt at all and in such cases, only a small amount of salt or the complete absence of salt is preferred. When inoculation with a culture of a lactic acid bacteria is carried out in the hydrolysis stage, the inoculation may take place before, at the beginning, or at any time during the hydrolysis.

The temperature at which the hydrolysis of the mixture of water and fermented protein koji takes place is preferably from 20° to 55° C. or from or between 25° C. to 50° C. and more preferably from 30° to 45° C.

Advantageously, the hydrolysis of the fermented protein koji may be followed by a second hydrolysis step either in the absence or presence of salt. The second hydrolysis is advantageously carried out at a lower temperature than the first hydrolysis step, preferably at a temperature from 2° to 20° C., for a period of from 12 hours to 25 days, more preferably from 3° to 15° C. for a period of from 18 hours to 22 days and especially from 4° to 10° C. for a period of from 24 hours to 20 days.

If desired, yeast may be present during the hydrolysis stage. If a second hydrolysis takes place, the yeast may be added either at the beginning, during or after the first hydrolysis stage or at the beginning or during the second hydrolysis stage.

The amount of yeast present may be from 1 to 50%, preferably from 2.5 to 40% and especially from 5 to 30% by weight based on the weight of the fermented protein koji. The yeast may be, for instance, instant dry yeast, e.g. *Saccharomyces cerevisiae*. When salt is present, the yeast used is preferably salt tolerant, e.g. *Candida versatilis* or *Debaryomyces hansenii*.

Advantageously, a glucose oxidase may be added to the mixture of the fermented protein koji and yeast for reducing the glucose content (usually from 2.0 to 2.5%), e.g. to below 1.0%, preferably to below 0.75% and especially below 0.5%. This reduction in the glucose content enables the production of a more stable finished product having a longer shelf life and an improved retention of color and taste. The glucose oxidase may be added before, during or after hydrolysis of the fermented protein koji.

After the hydrolysis, the hydrolysed fermented koji together with the culture of a lactic acid bacteria, and yeast if present, may be pressed to separate a liquid sauce from a solid residue. The liquid sauce is advantageously pasteurised, e.g. at a temperature of from 60° to 120° C. for a period of from 1 to 60 minutes and then filtered to give a liquid seasoning. If desired, the liquid sauce may be made into a powder for instance, by concentration, then dried, e.g. vacuum dried to a low moisture content and finally milled into a powder to give a solid seasoning.

The process according to the present invention results in a higher level or degree of release of amino acids than is generally possible with conventional soya sauce processes. The seasoning either in liquid or powder form has a higher amino acid content than soya sauce prepared by conventional methods. Because of the higher amino acid content, the seasoning of the present invention has more body than soya sauce prepared by conventional methods. The seasoning prepared according to the present invention has excellent organoleptical stability. In addition, since the moromi stage is eliminated, the whole production time may be shortened by from 1 to 6 weeks.

The culture of lactic acid bacteria imparts a slightly acid taste while the yeast imparts a pronounced meaty taste. The use of a combination of a lactic acid bacteria and a yeast imparts a less acidic and a meaty flavour. Both the lactic acid bacteria and the yeast can reduce the reducing sugar level. The two-step hydrolysis gives a high overall yield of taste impacting components and can give a lighter product which may be salt free or have a reduced salt content.

EXAMPLES

The present invention is further illustrated by the following Examples in which parts and percentages are given by weight.

Example 1

Wheat gluten was extruded through a CLEXTRAL extruder into pieces having an average diameter of 5 mm and had a porous structure.

65 kg of the extrudates were soaked in 65 kg water at 75° C. for 5 minutes. The soaked extrudates were then heated to 100° C. and held at the same temperature for 10 minutes and afterwards cooled to below 40° C. by applying vacuum. The pasteurisation step was carried out to eliminate secondary contamination after the extrusion step. Finally, the cooked extrudates were mixed with a mixture of 28 kg of roasted wheat and 20 g of TKJ (*Aspergillus oryzae* seed inoculum) to give a wheat gluten koji which was fermented for 42 hours by a procedure similar to that used in a conventional soya sauce process. The wheat gluten koji contained no added salt.

During the 42 hours of koji fermentation, the following temperature profiles were maintained for the culture bed:

| | |
|---|---|
| 0–25 hours | 30° C. |
| 25–42 hours | 27° C. |

Similar to a conventional soya sauce process, the koji was mixed at $18^{th}$ and $25^{th}$ hours to ensure sufficient airflow through the culture bed for good ventilation.

55 kg of the fermented wheat gluten koji was mixed with 150 kg of water at 37° C. which had previously been sterilised by boiling and then cooled. 11 kg of a broth culture of *Lactobacillus sake* were added to the fermented wheat gluten koji and the mixture was hydrolysed for 24 hours in a jacketed enclosed vessel with chilled water circulating through the jacket to maintain the desired temperature. The mixture was agitated continuously during the hydrolysis. Afterwards, the hydrolysed koji was hydrolysed a second time at 10° C. for 14 days.

Finally, the hydrolysed mixture was pressed to separate a wheat gluten sauce from a solid residue. The wheat gluten sauce was treated at 90° C. for 20 minutes. The liquid sauce was concentrated by evaporation. The concentrate obtained was dried in a vacuum oven and then milled into a powder.

For organoleptic evaluation, 10 g of liquid sauce or 3.5 g powder were diluted with 250 ml of boiling water. In both cases the seasoning was found to have more body and a more rounded flavour than a conventional soya sauce.

The powder was found to be shelf stable at 30° C. for more than 12 months in moisture-tight packaging (alulaminated sachets) and had excellent color stability. The seasoning was found to be microbiologically stable. The coliform count was significantly reduced when compared with a similar process where the hydrolysis was carried out in the absence of the broth culture of *Lactobacillus sake*.

Example 2

A similar procedure to that described in Example 1 was followed except that the second hydrolysis of the fermented wheat gluten koji at 10° C. for 14 days was omitted.

The seasoning was found to have more body and a more rounded flavour profile than a conventional soya sauce. The seasoning was microbiologically stable as in Example 1 and had excellent color stability in powder form. The coliform count was significantly reduced when compared with a similar process where the hydrolysis was carried out in the absence of the broth culture of *lactobacillus sake*.

Example 3

A similar procedure to that described in Example 1 was followed except that the hydrolysis of the fermented wheat gluten koji was carried out in the presence of 11 kg of an inoculum of a rehydrated instant dry yeast suspension in addition to the broth culture of *Lactobacillus sake*.

The seasoning was found to have more body and a more rounded flavour profile than a conventional soya sauce. The seasoning was microbiologically stable as in Example 1 and had excellent color stability in powder form. The coliform count was significantly reduced when compared with a similar process where the hydrolysis was carried out in the absence of the broth culture of *Lactobacillus sake* and the inoculum of the rehydrated instant dry yeast suspension.

Example 4

A similar procedure to that described in Example 1 was followed except that the hydrolysis of the fermented wheat gluten koji was carried out in the presence of 10 kg of salt. The seasoning was microbiologically stable as in Example 1 and had excellent color stability in powder form. The coliform count was significantly reduced when compared with a similar process where the hydrolysis was carried out in the absence of the broth culture of *Lactobacillus sake*.

We claim:

1. In a process for preparing a food seasoning composition wherein the process comprises preparing a koji material from protein-containing and carbohydrate materials and then adding water to the koji material and hydrolyzing the koji material, the improvements comprising preparing the koji material and in the absence of added salt, hydrolyzing the koji material in the presence of a culture of lactic acid bacteria at a temperature between 15° C. and 60° C. and at a pH of from 4.5 to 10 for from 6 hours to 28 days to obtain liquid and solid hydrolyzate material and separating the liquid and solid material to obtain a liquid seasoning composition without preparing a moromi.

2. A process according to claim 1 wherein the hydrolysis temperature is from 20° C. to 55° C.

3. A process according to claim 1 wherein the hydrolysis temperature is from 25° C. to 50° C.

4. A process according to claim 1 wherein added yeast is present with the koji material being hydrolyzed.

5. A process according to claim 4 wherein the yeast is present in an amount of from 1% to 50% by weight based upon the koji material weight.

6. A process according to claim 4 wherein a glucose oxidase composition is present with the material being hydrolyzed.

7. In a process for preparing a food seasoning composition wherein the process comprises preparing a koji material from protein-containing and carbohydrate materials and then adding water to the koji material and hydrolyzing the koji material, the improvements comprising preparing the koji material and in the absence of added salt and in a first hydrolysis stage, hydrolyzing the koji material and in the presence of a culture of lactic acid bacteria at a temperature between 20° C. and 60° C. and at a pH of from 4.5 to 10 to prepare first hydrolyzate material and in a second hydrolysis stage, hydrolyzing the first hydrolyzate material in the absence of added salt at a temperature of from 2° C. to 20° C. at a pH of from 4.5 to 10 to obtain liquid and solid hydrolyzate material, wherein the second stage hydrolysis is carried out for from 12 hours to 25 days and wherein the first and second stage hydrolysis are carried out for a combined time of from 18 hours to 28 days, and separating the liquid and solid hydrolyzate material to obtain a liquid seasoning composition without preparing a moromi.

8. A process according to claim 7 wherein the first stage hydrolysis temperature is from 30° C. to 45° C. and wherein the second stage hydrolysis temperature is from 3° C. to 15° C. and is carried out for from 18 hours to 22 days.

9. A process according to claim 7 wherein added yeast is present with the material being hydrolyzed during the second stage hydrolysis.

10. A process according to claim 9 wherein the yeast is present further with the material being hydrolyzed during the first stage hydrolysis.

11. A process according to claim 9 or 10 wherein the yeast is present in an amount of from 1% to 50% by weight based upon the weight of the material being hydrolyzed.

12. A process according to claim 9 or 10 wherein a glucose oxidase composition is present with the material being hydrolyzed.

13. A process according to claim 7 wherein the material present during the first stage hydrolysis is inoculated with the lactic acid bacteria culture so that the lactic acid bacteria of the culture are present during the first stage hydrolysis.

14. A process according to claim 13 wherein the material present during the first stage hydrolysis is inoculated with the lactic acid bacteria culture in an amount of from $10^3$ cfu to $10^7$ cfu bacteria per gram material present.

15. A process according to claim 1 or 7 wherein after preparation of the koji material, the koji material to be subjected to hydrolysis is inoculated with the lactic acid bacteria culture so that the lactic acid bacteria of the culture are present during the hydrolysis.

16. A process according to claim 15 wherein the koji material to be subjected to hydrolysis is inoculated with the lactic acid bacteria culture in an amount of from $10^3$ cfu to $10^7$ cfu bacteria per gram koji material.

17. A process according to claim 1 or 7 further comprising preparing the koji material with the lactic acid bacteria culture and so that the lactic acid bacteria of the culture are present during the preparation of the koji material and during hydrolysis.

18. A process according to claim 17 wherein the koji material is prepared with the lactic acid bacteria culture in an amount of from $10^3$ cfu to $10^7$ cfu bacteria per gram of koji preparation materials.

19. A process according to claim 1 or 7 wherein the lactic acid bacteria culture is a culture of *Lactobacillus sake*.

20. A process according to claim 1 or 7 wherein the liquid and solid material hydrolyzate is pressed to separate the liquid and solid material.

21. A process according to claim 1 or 7 further comprising pasteurizing the liquid seasoning composition to prepare a pasteurized liquid composition and filtering the pasteurized liquid composition to obtain a filtered, pasteurized liquid seasoning composition.

22. A process according to claim 1 or 7 further comprising concentrating the liquid seasoning composition to obtain a concentrated liquid, drying the concentrated liquid to obtain a product dried for milling and then milling the dried product to obtain a powder.

* * * * *